Figure 1:
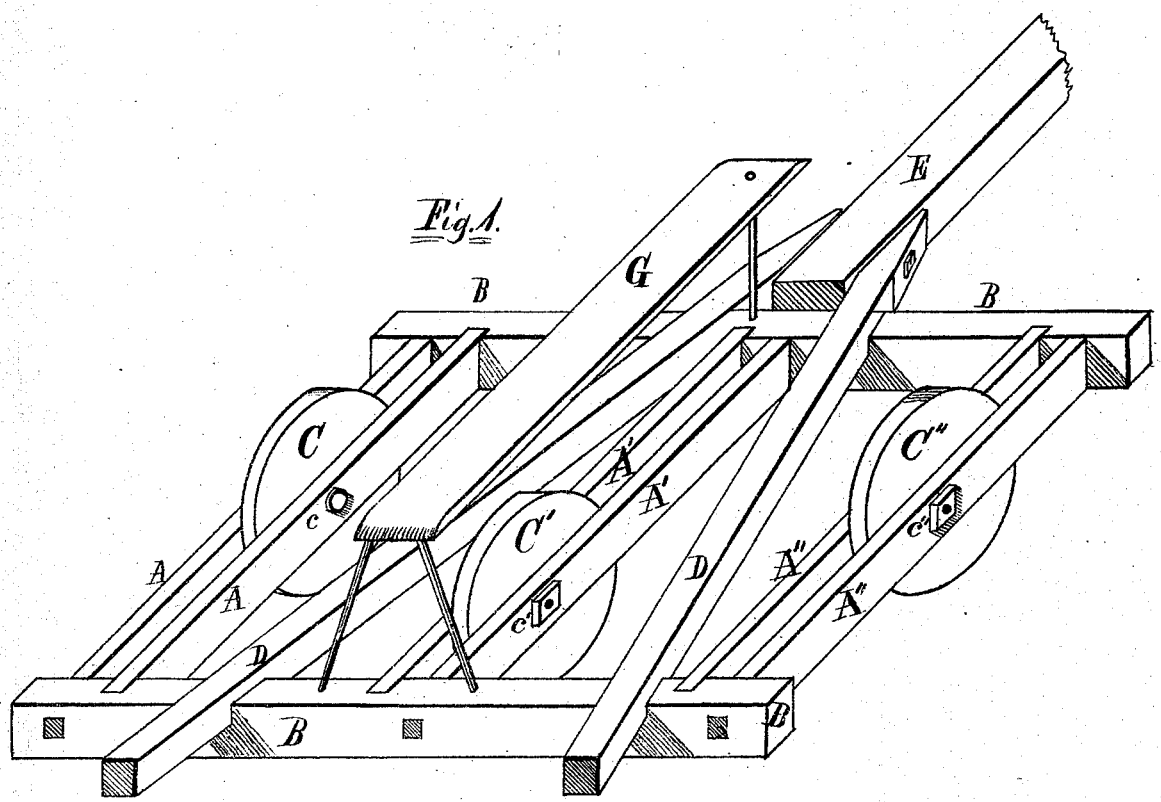

Francis B. Kendall.—Corn Marker.

116838  PATENTED JUL 11 1871

Witnesses:
Platt R. Richards.
D. H. Clarke.

Inventor,
Francis B. Kendall,
by W. B. Richards,
his Atty.

UNITED STATES PATENT OFFICE.

FRANCIS B. KENDALL, OF MONMOUTH, ILLINOIS.

IMPROVEMENT IN CORN-GROUND MARKERS.

Specification forming part of Letters Patent No. 116,838, dated July 11, 1871.

*To all whom it may concern:*

Be it known that I, FRANCIS B. KENDALL, of Monmouth, in the county of Warren and State of Illinois, have made certain Improvements in Machine for Marking Out Corn-Ground, of which the following is a specification:

The nature of my invention relates to improvements in that class of markers in which the operator rides on the machine and marks out three rows at one passage of the team; and the invention consists in the arrangement of roller-markers in a rectangular frame in such a manner that they will adjust themselves to inequalities of the surface of the soil, and securing said rollers by such bearings in the main frame as admit of tightening them up when desirable to use them as slides in hard ground, all as hereinafter fully described.

Figure 1 is a perspective view of a machine embodying my invention.

A A A' A' A'' A'' represent three pairs of parallel bars secured by transverse bars B B, the whole forming a rectangular frame. C C' C'' are rollers or wooden wheels, secured or carried on bearings between the bars A A A' A' A'' A'', respectively. The side wheels C C'' are set about one-half their diameters forward of the central wheel C'. $c$ $c'$ $c''$ are axial bolts, with nuts on one end. The bolts passing through the frame-pieces A A A' A' A'' A'', respectively, form bearings or spindles on which the wheels C C' C'' revolve. D D are braces on the main frame A B, their ends projecting from the forward side of said frame, as shown. E is the draft-pole, pivoted at its rear end between the forwardly-projecting ends of braces D D. G is the driver's seat, extending longitudinally across the main frame, and elevated on legs $g$ $g$ $g$.

The operation of my invention is as follows: In ordinary mellow ground or soil, the bolts $c$ $c'$ $c''$ are left a little loose, so that the wheels C C' C'' may revolve freely, and in such soil said wheels, when revolving, will make a sufficiently distinct mark to plant by.

In hard soil, packed by rain or otherwise, the nuts on the bolts $c$ $c'$ $c''$ may be tightened up until the pressure of the bars A on each side of said wheels will prevent them turning, when they will act as slides and make a distinct mark.

The arrangement of the central wheel C' rearward of the others will allow said wheel to drop to and mark low places, and, also, to be elevated on high places, while the side wheels drop to low places, thus insuring certainty of marking on uneven land.

I claim—

The wheels C C' C'' pivoted to the frame A A' A'' by bolts $c$ $c'$ $c''$, constructed and operated in the manner substantially as and for the purpose specified.

FRANCIS B. KENDALL.

Witnesses:
PLATT R. RICHARDS,
D. H. CLARKE.